US012093245B2

United States Patent
Ye et al.

(10) Patent No.: US 12,093,245 B2
(45) Date of Patent: Sep. 17, 2024

(54) TEMPORAL DIRECTED CYCLE DETECTION AND PRUNING IN TRANSACTION GRAPHS

(71) Applicant: INTERNATIONAL BUSINESS MACHINES CORPORATION, Armonk, NY (US)

(72) Inventors: Guangnan Ye, Yorktown Heights, NY (US); Toyotaro Suzumura, New York, NY (US); Keith Coleman Houck, Rye, NY (US); Kumar Bhaskaran, Englewood Cliffs, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 16/852,312

(22) Filed: Apr. 17, 2020

(65) Prior Publication Data
US 2021/0326332 A1 Oct. 21, 2021

(51) Int. Cl.
*G06N 20/00* (2019.01)
*G06F 16/23* (2019.01)
(Continued)

(52) U.S. Cl.
CPC ...... *G06F 16/2379* (2019.01); *G06F 16/9024* (2019.01); *G06N 20/00* (2019.01); *G06Q 20/4016* (2013.01)

(58) Field of Classification Search
CPC ............ G06F 16/2379; G06F 16/9024; G06Q 20/4016; G06N 20/00
(Continued)

(56) References Cited

U.S. PATENT DOCUMENTS

| 8,978,010 B1 * | 3/2015 | Thumfart | G06F 8/36 717/123 |
| 9,038,177 B1 | 5/2015 | Tierney | |

(Continued)

FOREIGN PATENT DOCUMENTS

| CN | 107918905 A | * 4/2018 | ......... G06Q 30/0609 |
| CN | 109086975 A | * 12/2018 | ........... G06K 9/6218 |

OTHER PUBLICATIONS

Mell, P. et al., "Recommendations of the National Institute of Standards and Technology"; NIST Special Publication 800-145 (2011); 7 pgs.
(Continued)

*Primary Examiner* — Mark E Hershley
*Assistant Examiner* — Antonio J Caiado
(74) *Attorney, Agent, or Firm* — Intelletek Law Group, PLLC; Gabriel Daniel, Esq.

(57) ABSTRACT

A method for improving computing efficiency of a computing device for temporal directed cycle detection in a transaction graph includes preparing the transaction graph based on a plurality of transactions, the transaction graph including nodes indicating transaction origination points and transaction destination points, and edges indicating interactions between the nodes. Irrelevant nodes in the transaction graph are identified and pruned to provide a pruned, preprocessed transaction graph which can be partitioning into sections, where each section includes selected nodes that are linked to other linked nodes therein. Each of the sections having non-cyclic nodes can be trimmed prior to performing cycle detection on the resulting pruned transaction graph. Post-processing pruning can be performed to further reduce the number of detected cycles that may be of interest to a particular application, such as in anti-money laundering.

14 Claims, 7 Drawing Sheets

(51) Int. Cl.
   *G06F 16/901*   (2019.01)
   *G06Q 20/40*    (2012.01)

(58) Field of Classification Search
   USPC .......................................................... 707/703
   See application file for complete search history.

(56) References Cited

U.S. PATENT DOCUMENTS

| | | | | |
|---|---|---|---|---|
| 9,294,497 | B1* | 3/2016 | Ben-Or | H04L 63/1433 |
| 11,563,571 | B1* | 1/2023 | Teja | H04L 9/3247 |
| 2012/0005642 | A1* | 1/2012 | Ispir | G06F 30/30 |
| | | | | 716/113 |
| 2012/0331064 | A1* | 12/2012 | Deeter | G06Q 10/10 |
| | | | | 709/204 |
| 2013/0151453 | A1* | 6/2013 | Bhanot | G06Q 10/06375 |
| | | | | 706/46 |
| 2014/0143110 | A1* | 5/2014 | Qin | G06Q 40/10 |
| | | | | 705/37 |
| 2015/0227582 | A1* | 8/2015 | Gu | G06F 16/2453 |
| | | | | 707/713 |
| 2016/0379132 | A1* | 12/2016 | Jin | H04L 67/535 |
| | | | | 706/12 |
| 2017/0053294 | A1* | 2/2017 | Yang | G06Q 20/4016 |
| 2017/0069310 | A1* | 3/2017 | Hakkani-Tur | G10L 15/1815 |
| 2017/0140382 | A1* | 5/2017 | Chari | G06Q 20/389 |
| 2017/0220674 | A1 | 8/2017 | Malik et al. | |
| 2018/0129700 | A1* | 5/2018 | Naccache | G06F 16/9024 |
| 2018/0240119 | A1* | 8/2018 | Shah | H04W 12/126 |
| 2018/0320239 | A1* | 11/2018 | Babiarz | G16B 20/10 |
| 2019/0050833 | A1* | 2/2019 | Hu | G06Q 20/00 |
| 2019/0138595 | A1 | 5/2019 | Galitsky | |
| 2019/0227777 | A1* | 7/2019 | ChoFleming, Jr. | G06F 15/82 |
| 2019/0318359 | A1* | 10/2019 | Arora | G06Q 20/20 |
| 2019/0325063 | A1* | 10/2019 | Han | G06F 16/36 |
| 2019/0386888 | A1* | 12/2019 | Dewar | H04L 43/02 |
| 2020/0074029 | A1* | 3/2020 | Date | G06F 30/23 |
| 2020/0151815 | A1* | 5/2020 | Whitfield | G06Q 40/04 |
| 2020/0167786 | A1* | 5/2020 | Kursun | H04L 63/08 |
| 2020/0184473 | A1* | 6/2020 | Fang | H04L 9/3236 |
| 2020/0279289 | A1* | 9/2020 | Naphade | H04N 21/812 |
| 2021/0287303 | A9* | 9/2021 | Chrapko | G06Q 40/02 |
| 2022/0108328 | A1* | 4/2022 | Verma | G06Q 10/063 |
| 2022/0122183 | A1* | 4/2022 | Jacob | G06F 3/04895 |
| 2022/0156727 | A1* | 5/2022 | Yan | G06Q 20/06 |

OTHER PUBLICATIONS

Soltani, R. et al. "A new algorithm for money laundering detection based on structural similarity"; IEEE 7th Annual Ubiquitous Computing, Electronics & Mobile Communication Conference (UEMCON), IEEE (2016) 8 pgs.

Phua, C. et al. "A comprehensive survey of data mining-based fraud detection research"; arXiv preprint arXiv:1009.6119 (2010), 14 pgs.

Awasthi, A. "Clustering algorithms for anti-money laundering using graph theory and social network analysis"; CRM Master Research Project: Dissertation (2012); 75 pgs. (part 1 of 2, 37 pgs.).

Awasthi, A. "Clustering algorithms for anti-money laundering using graph theory and social network analysis"; CRM Master Research Project: Dissertation (2012); 75 pgs. (part 2 of 2, 38 pgs.).

Chen, Y. et al., "Fuzzy computing applications for anti-money laundering and distributed storage system load monitoring"; Google Inc. (2011); 5 pgs.

Michalak, K. et al., "Graph mining approach to suspicious transaction detection"; Federated conference on computer science and information systems (FedCSIS); IEEE (2011); 7 pgs.

Jaber, M. "Detecting hierarchical relationships and roles from online interaction networks"; Diss. Birkbeck, University of London, Dissertation (2015); 187 pgs. (part 1 of 2, 93 pgs.).

Jaber, M. "Detecting hierarchical relationships and roles from online interaction networks"; Diss. Birkbeck, University of London, Dissertation (2015); 187 pgs. (part 2 of 2, 94 pgs.).

* cited by examiner

TEMPORAL DIRECTED CYCLE DETECTION AND PRUNING IN TRANSACTION GRAPHS

BACKGROUND

Technical Field

The present disclosure generally relates to computer systems and software for use therewith, and more particularly, to methods and systems for temporal directed cycle detection and pruning in transaction graphs.

Description of the Related Art

A transaction graph provides a visual representation of one or more electronic transactions and the electronic nodes (e.g., addresses) that sent and received the electronic transactions. Such transaction graphs include nodes for each transaction origination and destination, with edges between such nodes to indicate the direction of the transaction. Several graph-based analytics methods have been proposed for cycle detection. In order to discover unauthorized transactions in a transaction graph, directed cycles can be detected in transaction graphs.

SUMMARY

According to various embodiments, a computing device, a non-transitory computer readable storage medium, and a method are provided for temporal directed cycle detection and pruning in transaction graphs.

According to various embodiments, a computing device, a non-transitory computer readable storage medium, and a method are provided for improving the efficiency of a computing device for temporal directed cycle detection and pruning in transaction graphs, wherein the computing device includes a processor, a network interface coupled to the processor to enable communication over a network, a storage device coupled to the processor and a temporal directed cycle detection and pruning code stored in the storage device, wherein an execution of the code by the processor configures the computing device to perform acts comprising preparing a transaction graph based on a plurality of transactions. The transaction graph includes nodes indicating transaction origination points and transaction destination points, and edges indicating interactions between the nodes. The computing device can identify irrelevant nodes in the transaction graph and prune the irrelevant nodes to provide a pruned, preprocessed transaction graph. The computing device can partition the pruned, preprocessed transaction graph into sections, where each section includes selected nodes that are linked to other linked nodes therein, and trim each of the sections having non-cyclic nodes. The computing device can further detect cycles of detected cycle nodes for each of the sections.

In one embodiment, the processor configures the computing device to perform acts further comprising applying a time component to each interaction, the time component providing a relative time for each of the interactions between the nodes of the transaction graph.

In one embodiment, the edges forming each detected cycle are in temporal sequential order.

In one embodiment, the irrelevant nodes are nodes that are involved in an interaction below a predetermined threshold. Alternately, or in addition to the above, the irrelevant nodes are nodes that are identified as super nodes.

In one embodiment, the processor configures the computing device to perform acts further comprising identifying select ones of the detected cycle nodes associated with known customer attributes and pruning the select ones of the detected cycle nodes from the detected cycles.

In one embodiment, the processor configures the computing device to perform acts further comprising identifying a geo-location of each of the detected cycle nodes and pruning selected ones of the detected cycle nodes upon determining that the selected ones are associated with a single entity, the selected ones are separated by a predetermined minimum distance, and the selected ones are associated with interactions performed within a predetermined maximum time separation.

In one embodiment, the processor configures the computing device to perform acts further comprising using machine learning to cause the computing device to identify learned nodes either for pruning from the transaction graph or for flagging as a suspect transaction known to form a transaction cycle.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The systems and methods of the present disclosure may be useful in various applications, including in the detection of unauthorized computerized transactions.

Graph cycle detection can be extended to temporal directed cycle detection to improve computational efficiencies for cycle detection in various applications. The approaches of the present disclosure can not only provide better directed cycle prediction accuracy, but also can show the operator and compliance personnel what actually happens to unauthorized computer transactions. Cycle detection in transaction graphs is known as a time-consuming graph analytics tool. In order to accelerate the detection, the present disclosure provides several preprocessing pruning and postprocessing pruning methods to prune the irrelevant nodes in the transaction graph. Moreover, in order to retrieve the most relevant cycles, robust machine learning features can be developed on top of the initial detected temporal directed cycles so that directed cycle prediction will not only show more accurate results, but also with the real transaction flow representation.

The present disclosure generally relates to systems and computerized methods of accelerating cycle detection in transaction graphs by improving efficiencies of computer systems performing such a task. Efficiencies may be improved by various methods, as discussed below, such as directing cycle detection temporally, pruning irrelevant nodes in preprocessing, detecting strongly connected components, detecting fast temporal directed cycles and pruning cycles in postprocessing. Reference now is made in detail to the examples illustrated in the accompanying drawings and discussed below.

Figure 1:
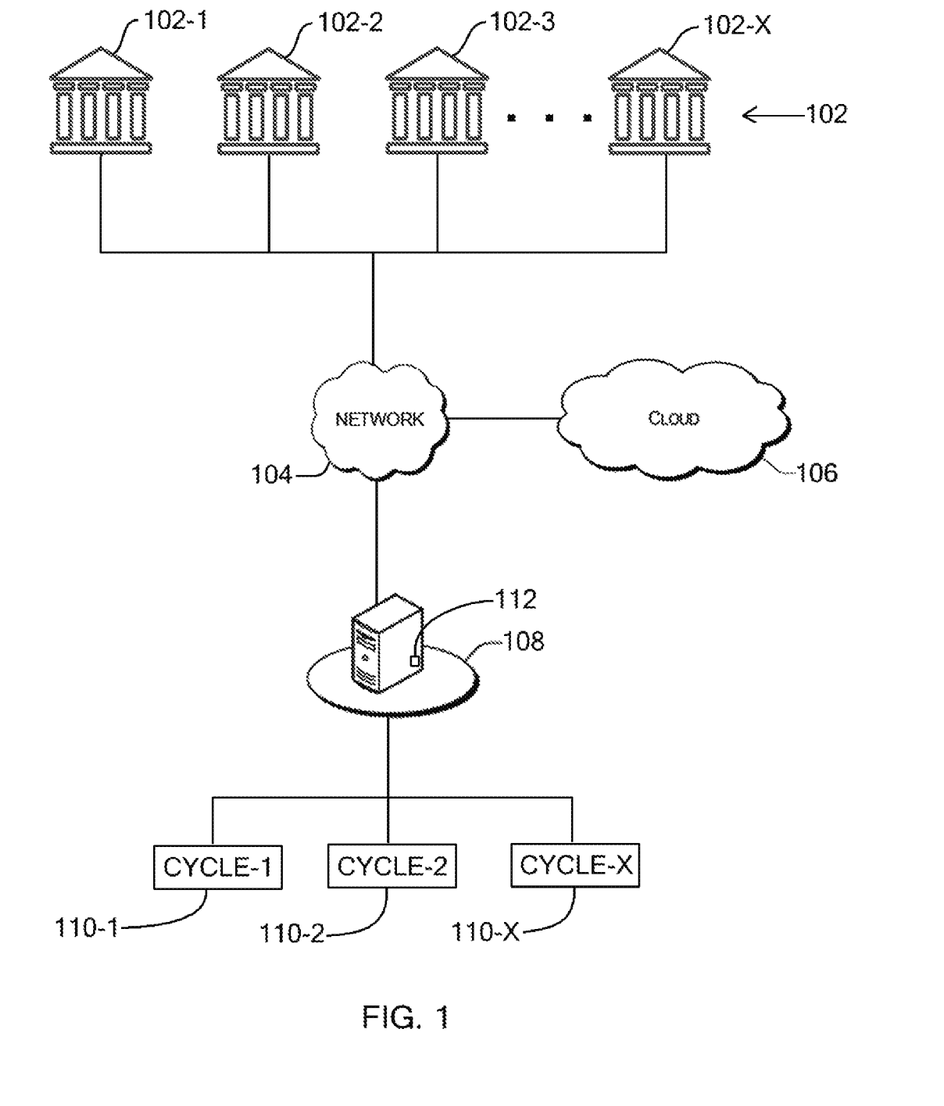
FIG. 1 illustrates an example data flow architecture of a system for temporal directed cycle detection and pruning in transaction graphs.

FIG. 1 illustrates a data flow diagram 100 of a system for temporal directed cycle detection and pruning in transaction graphs. Data flow diagram 100 includes one or more transaction facilitators 102-1, 102-2, 102-3, 102-X, collectively referred to as transaction facilitators 102. The transaction facilitators 102 may be financial institutions, for example, banks, credit unions, or the like, that perform financial transactions between two or more parties. The data flow diagram 100 further includes a network 104 for receiving data from the transaction facilitators 102. The network 104 may be, without limitation, a local area network ("LAN"), a virtual private network ("VPN"), a cellular network, the Internet, or a combination thereof. For example, the network 104 may include a mobile network that is communicatively coupled to a private network, sometimes referred to as an intranet, that provides various ancillary services, such as communication with various databases, potential participants, the Internet, and the cloud 106. The cloud 106 may be used to store data, including raw transaction data from the transaction facilitators 102 prior to processing by a computing device 108. Other data storage options may be considered within the scope of the disclosure, including memory modules, such as random-access memory (RAM), or data storage, such as one or more hard drives, provided in the computing device 108.

The computing device 108 may include a processor 112 for processing program code specifically directed toward carrying out methods for temporal directed cycle detection and pruning in transaction graphs, as described in greater detail below.

The computing device 108 is shown in the form of a server in FIG. 1, however, various examples of particularly configured computing devices 108 that may be used to perform temporally directed cycle detection in transaction graphs. Today, computing devices typically take the form of mainframe computers, desktop computers, laptop computers, quantum computing machines, portable handsets, smartphones, tablet computers and the like.

The data flow diagram 100 includes one or more data outputs 110-1, 110-2, 110-X, generated by the computing device 108, that provide the user with a temporal directed cycle detected by pruning transaction graphs. The data outputs 110-1, 110-2, 110-X may be provided in various formats, including as electronic data describing the transactions of interested, as a printed output, as a displayed output, or the like.

Figure 2:
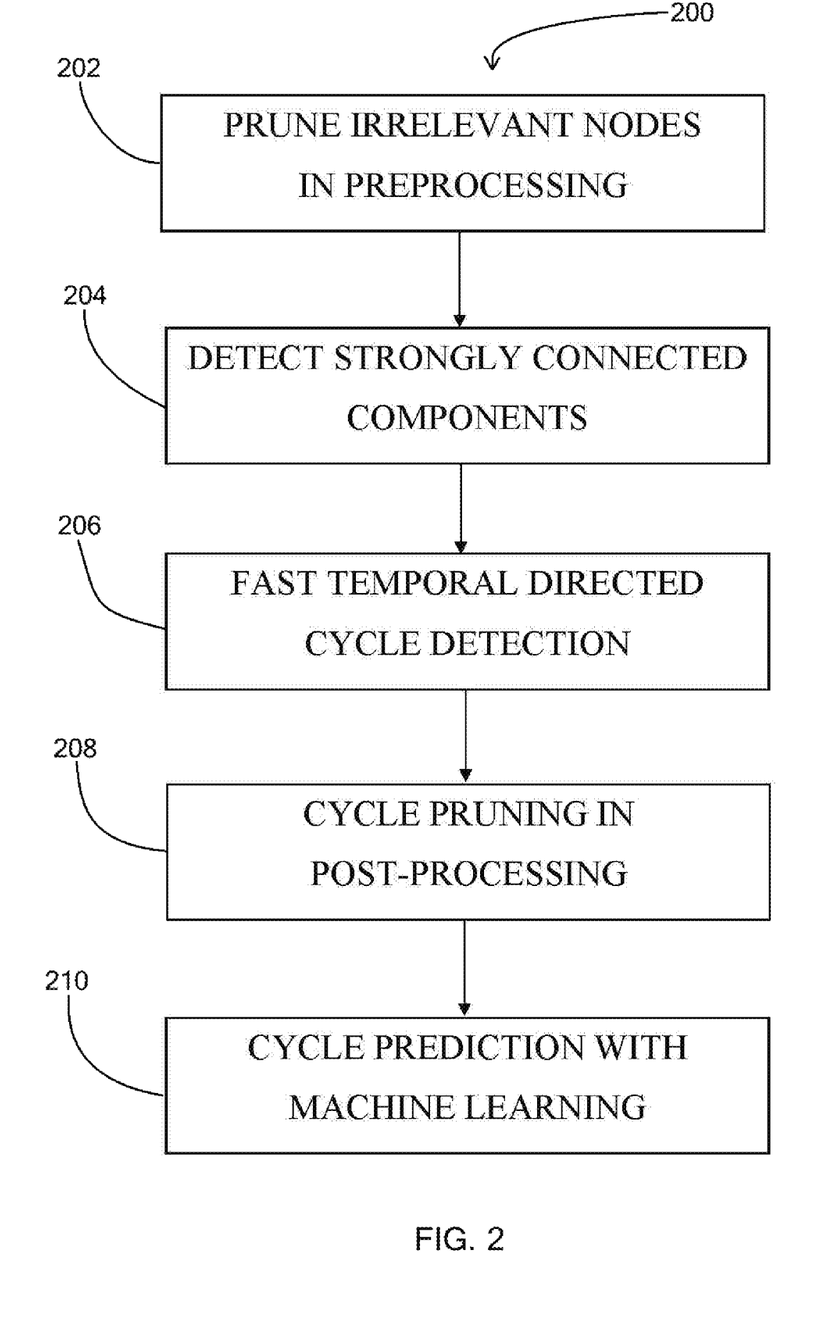
FIG. 2 is a flow chart illustrating a workflow of temporal directed cycle detection and pruning in transaction graphs.

Referring now to FIG. 2, a workflow 200 of a method for temporal directed cycle detection and pruning in transaction graphs is summarized. Since conventional computation for cycle detection using transaction graphs requires significant computation resources, the present disclosure describes methods, systems and software that improve upon computation efficiencies for discovering cycles in transaction graphs.

Briefly stated, one block in the workflow 200 includes a pre-processing pruning block 202 to prune the irrelevant nodes. This pruning block 202 can include node and transaction removal with a transaction threshold and super node removal. It has been discovered that temporal directed cycles exist in strongly connected components. A strongly connected component block 204 can include the application of a trim operation and a recursive forward-backward (FW-BW) to detect the strongly connected components. In certain embodiments, those nodes that are not part of the strongly connected components can be removed from the transaction graph. On each strongly connected components, a fast temporal directed cycle detection block 206 can run, in parallel, to act as source detection for root nodes and constrained depth first search for cycles. Then, in a postprocessing pruning block 208, nodes and cycle pruning with customer attributes can be performed, as well as pruning of nodes and cycles with geo-location information. Finally, in order to retrieve the most relevant transaction cycles, graph-based cycle features can be generated in block 210, where robust machine learning models can be applied to these cycle features. The details of each of these blocks 202, 204, 206, 208, 210 are described below. By way of example only, and not by way of limitation, the transaction cycles will be discussed below in the context of an identification of an unauthorized electronic transaction, such as a money laundering procedure.

As discussed above, temporal directed cycle detection computation is time consuming and consumes significant computing resources. Time complexity of conventional cycle detection is $O((n+e)(c+1))$ for n nodes, e edges and c simple cycles. In order to accelerate the cycle detection process and reduce computational resources, thereby improving computing efficiencies, the methods, system and software of the present disclosure can provide the techniques provided herein and as detailed below.

Figure 3A:
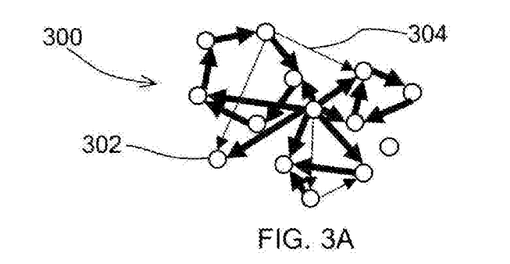
FIG. 3A is a graph illustrating a transaction graph prior to application of methods according to an embodiment of the present disclosure.

For discussion purposes, and referring to FIG. 3A, V can be defined as a given set of nodes. In a transaction graph 300, each node 302 can represent a customer account, for example. An interaction 304 can be defined as a triplet (u, v, t), where u is an origination node of the interaction, v is the destination of the interaction, u, v<V, and t is a strictly positive natural number representing the time the interaction took place. In transaction graph, in time t, if there is a transaction from u to v, then there is a directional link, also referred to as an edge, added from u to v with attribute timestamp t. In FIGS. 3A through 3G, each node is represented in a circle, a filled circle node denotes a suspicious account and a dashed node denotes a filtered account, as described in greater detail below. An edge can be shown in varying thicknesses related to the relative values of each transaction.

Figure 3B:
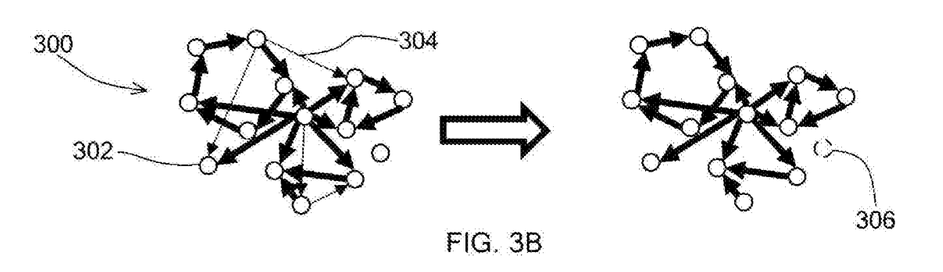
FIG. 3B is a graph illustrating an example of pruning irrelevant nodes in preprocessing of a transaction graph based on a transaction threshold.
Figure 3C:
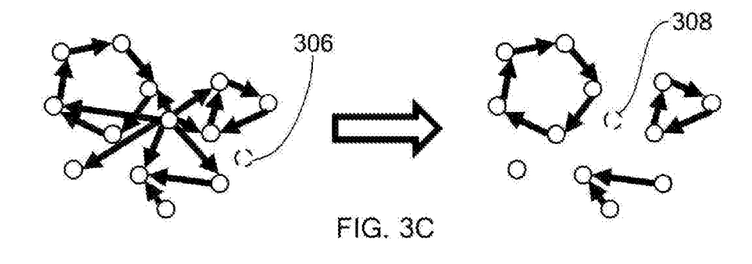
FIG. 3C is a graph illustrating an example of pruning irrelevant nodes in preprocessing of a transaction graph based on super node removal.

Referring to FIGS. 2, 3B and 3C, in the pre-processing pruning block 202, the computing device can use two methods to prune irrelevant transactions and nodes 306, 308 in the transaction graph 300. Assuming that money laundering, for example, happens only with certain large amount of money in the transactions, the method could apply some thresholds on the transactions to remove the irrelevant small transactions and associated nodes, such as node 306. In such act, certain nodes that only include relatively small transactions, such as transactions below a predetermined threshold, can be pruned at the beginning, prior to any cycle detection processing. From an analysis that small transactions occupy a large percentage of the entire transactions, such pruning block 202 can largely reduce the algorithm complexity and required computational resources for cycle detection.

Another finding is that there are occasionally super nodes 308 that exist in the transaction graph. Specifically, a super node is defined as an account that has a large amount of incoming or outgoing transactions. In this example, such accounts are typically from popular service corporations, such as telecommunication companies, utility companies and the like. Transactions from such accounts can be considered as reliable accounts that would not play any role in money laundering. The pruning block 202 can then use certain thresholds on the node degree to remove the irrelevant super nodes, such as super node 308, and the associated significant number of transactions.

Figure 3D:
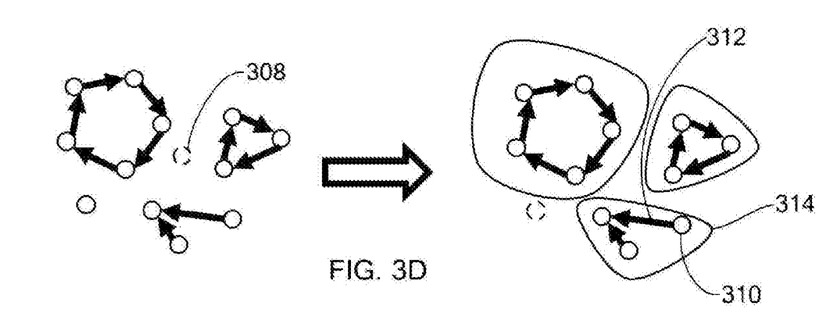
FIG. 3D is a graph illustrating an example of detecting strongly connected components in a transaction graph.

With the above pre-processing block 202, the computing device can prune many irrelevant nodes and transactions. However, there may still be a large number of nodes for temporal directed cycle detection. Referring now to FIGS. 2 and 3D, to further shrink the node candidate pool, the methods of the present disclosure can use the observation that temporal directed cycles exist in strongly connected components in the transaction graph. Formally, a directed graph is strongly connected if there is a path between all pairs of vertices. A strongly connected component of a directed graph is a maximal strongly connected subgraph. At block 204, the computing device can detect the strong connected components prior to cycle detection. Then, parallel detection of the temporal directed cycle in each strongly connected component can reduce the computing time and resources for cycle detection. An algorithm, for example, such as strongly connected component parallel algorithms known in the art, can be applied to the transaction graph. In block 204, a trim operation in parallel on multiple non-cyclic nodes is performed. The non-cyclic nodes are those nodes that do not form a cycle with other nodes. A conventional recursive FW-BW algorithm can be applied using a work queue to further identify strongly connected components. Accordingly, with these algorithms, the strongly connected components can be computed in a very efficient manner. Nodes 310 and transactions 312 that are not strongly connected, such as those indicated within loop 314, may be removed, as shown in FIG. 3E.

In block 206, the computing device can process an algorithm for fast temporal directed cycle detection, as may be known in the art, where there are two phases included therein. In the first phase, which is called the source detection phase, the algorithm configures the computing device to gather candidate root nodes for all the temporal directed cycles only in one pass over the whole transaction graph. In the second phase, for every quadruple of root node, a constrained depth first search algorithm is applied. In this way, all simple cycles rooted at the given node would be output in time $O(c(n+m))$ where c is the number of cycles and n and m are respectively the number of nodes in the candidate set of the root node and the number of interactions among these nodes in the given time interval.

Figure 3E:
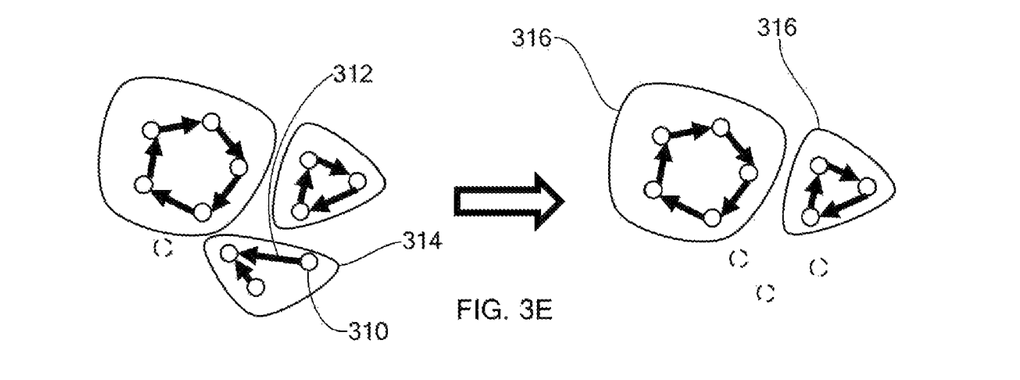
FIG. 3E is a graph illustrating an example of fast temporal directed cycle detection within a transaction graph.
Figure 3F:
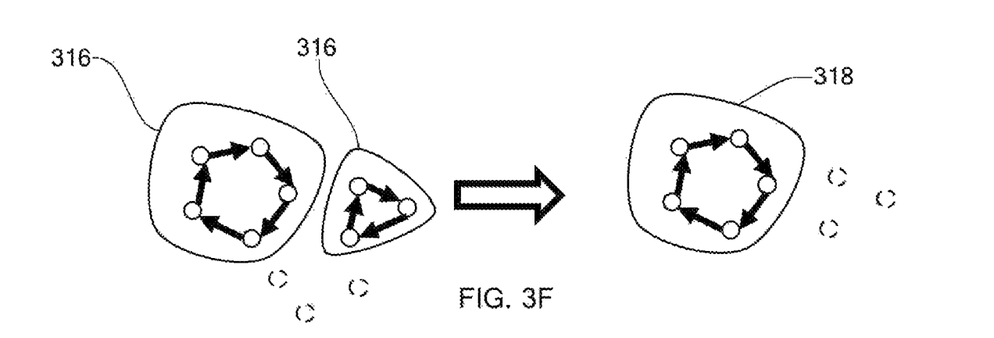
FIG. 3F is a graph illustrating an example of cycle pruning in postprocessing in a transaction graph.

Referring to FIGS. 2, 3E and 3F, with the initially detected temporal directed cycles 316, cycle pruning block 208 can be applied by the computing device in a post-processing procedure. For example, except for the information from the layer of the transaction graph, the block 208 could borrow more information from the layer of customer relationship and attributes so that nodes and cycle could be further pruned.

First, in the example above, with the initial know your customer (KYC) information, or from offline learning acts, the computing device could judge whether an account is trusted or not. If it is trusted, such as a utility, such account nodes and transactions can be pruned. Specifically, trustiness can be learned from the account's behavior. It could be learned based on external resources such as Bloomberg®, which indicates it is a legitimate business account, or learned based on transaction behaviors, e.g., if their transaction behavior is truly stationary, like sending similar amounts to the same counter party, it can be treated as "trust account".

Second, the same customer may open several related accounts with various attribute information. Usually, entity resolution is used to identify whether several accounts with different attributes belong to the same customer. Standard entity resolution can be applied on the customer layer. Then, if more than one account in the detected temporal directed cycle belongs to the same customer, the possibility of an unauthorized electronic transaction, such as money laundering in the present example, can be flagged as being high. Consequently, the methods can prune out the cycles that include nodes that belong to all different customers.

Figure 3G:
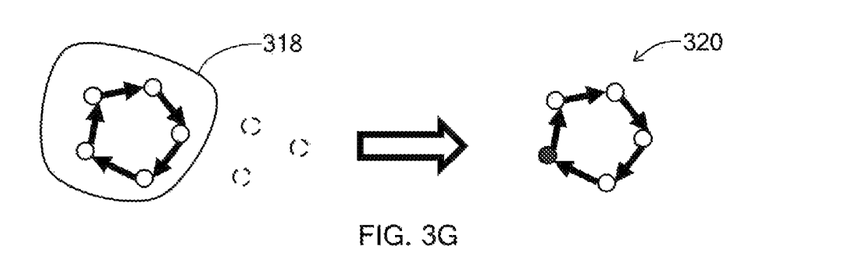
FIG. 3G is a graph illustrating an example of an output of the system, showing a temporal directed cycle detected in a transaction graph.

Third, geo-location information could be used in the post-processing block 208. For example, if in the detected temporal directed cycle, two transactions in the similar timestamp happen in two separate long-distance separated geo-locations by the same customer, then such behavior can be flagged as suspicious. Loop 318 may indicate a directed cycle detected after the post-processing block 208. FIG. 3G illustrates the output of the system, where a detected cycle 320 provides a prediction of an unauthorized electronic transaction (e.g., anti-money laundering activity). Such a prediction can be made in a computationally efficient matter through the acts described above.

With the above described temporal directed cycles detection and pruning, a graph-based machine learning feature can be implemented so that only relevant cycles are preserved, for example those cycles that are suspicious in a money laundering investigation. In detail, for each temporal directed cycle candidate, such as detected cycle 320 of FIG. 3G, machine learning can be applied to predict whether the root node of the cycle is an alert account or not. Specifically, assume there is a detected cycle of six nodes. One machine learning feature can have nine dimensions, which are length of the cycle, amt1, amt2, amt3, amt4, amt5, amt6, case account included, and temporal window size, where amtx is the transaction amount for node x. A second feature has seven dimensions, which are length of the cycle, amt1, amt2, amt3, amt4, amt5, and amt6. A third feature has three dimensions, which are length of the cycle, case account included, and temporal window size. A fourth feature has six dimensions, which are the 11-norm of amt1, amt2, amt3, amt4, amt5, and amt6. A fifth feature has six dimensions, which are the 12-norm of amt1, amt2, amt3, amt4, amt5, and amt6. A supervised machine learning model, e.g., a support vector machine, can be used to train the computing device on top of each individual feature, and apply late fusion (average pooling) to combine the results from the five learning model features to learn which nodes may be susceptible to unauthorized transactions. Finally, the methods of the present disclosure could generate the temporal directed cycles with root nodes with high alerted scores. Thus, not only are computational efficiencies improved with the acts 202, 204, 206, 208 as described above with respect to FIG. 2, but also the machine learning block 210 can be applied by the computing device to further improve the accuracy of the prediction based on the detected cycle.

For example, machine learning may be used herein to construct algorithms that can learn from and make predictions based on the detected cycle data that may be stored in a data repository, such as the cloud 106, as described above with reference to FIG. 1. Such algorithms operate by building a model from stored prior inputs or baselines therefrom in order to make data-driven predictions or decisions (or to provide threshold conditions to indicate whether an account, or node, should be included in the transaction graph), rather than following strictly static criteria. Based on the machine learning, patterns and trends are identified, and any outliers identified as not belonging to the cluster.

In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

With the above temporal directed cycles detection and pruning methods, unauthorized electronic transactions can be identified. For example, the cycles of money flow in money laundering can be accurately presented for further investigation.

Referring back to FIG. 2, process 200 is illustrated as a collection of blocks, each in a logical flowchart, which represent sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 200 is described with reference to the data flow diagram 100 of FIG. 1.

Figure 4:
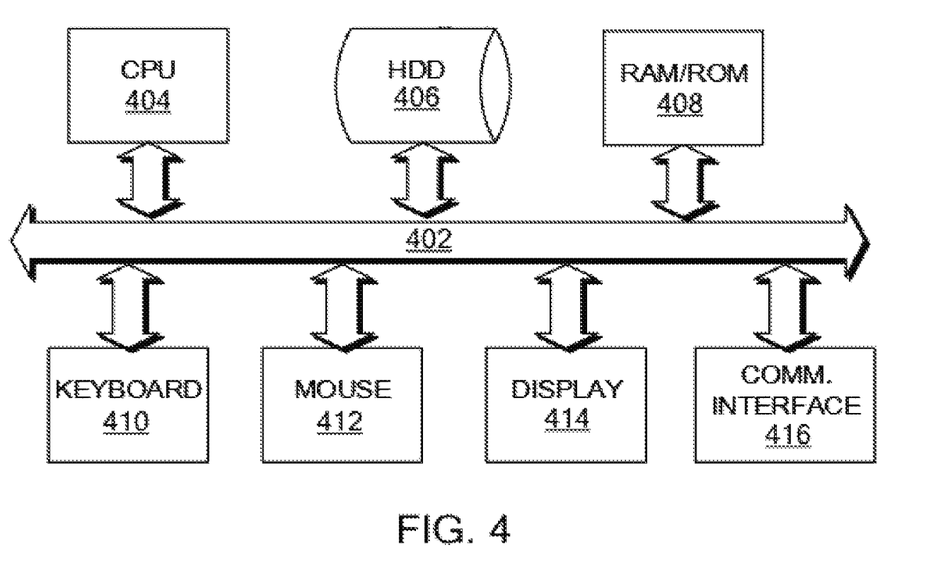
FIG. 4 is a functional block diagram illustration of a computer hardware platform that can be used to implement the steps shown in FIGS. 3A through 3G.

As discussed above, functions relating to temporal directed cycle detection and pruning in transaction graphs, can be performed with the use of one or more computing devices, such as computing device 108, connected for data communication via wireless or wired communication, as shown in FIG. 1 and in accordance with the process 200 of FIG. 2. FIG. 4 provides a functional block diagram illustration of a computer hardware platform 400 that can be used to implement a particularly configured computing device that can perform the methods described herein for temporal directed cycle detection and pruning in transaction graphs. In particular, FIG. 4 illustrates a network or host computer platform 400, as may be used to implement an appropriately configured computing device, such as the computing device 108 FIG. 1.

The computer platform 400 may include a central processing unit (CPU) 404, a hard disk drive (HDD) 406, random access memory (RAM) and/or read only memory (ROM) 408, a keyboard 410, a mouse 412, a display 414, and a communication interface 416, which are connected to a system bus 402.

In one embodiment, the HDD 406, has capabilities that include storing a program that can execute various processes, such as the processes for temporal directed cycle detection and pruning in transaction graphs as described in FIG. 2, in a manner described herein.

In one embodiment, a program, such as Apache™, can be stored for operating the system as a Web server. In one embodiment, the HDD 406 can store an executing application that includes one or more library software modules, such as those for the Java™ Runtime Environment program for realizing a JVM (Java™ virtual machine).

Example Cloud Platform

As discussed above, functions relating to managing the compliance of one or more client domains, may include a cloud 106 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as ollows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
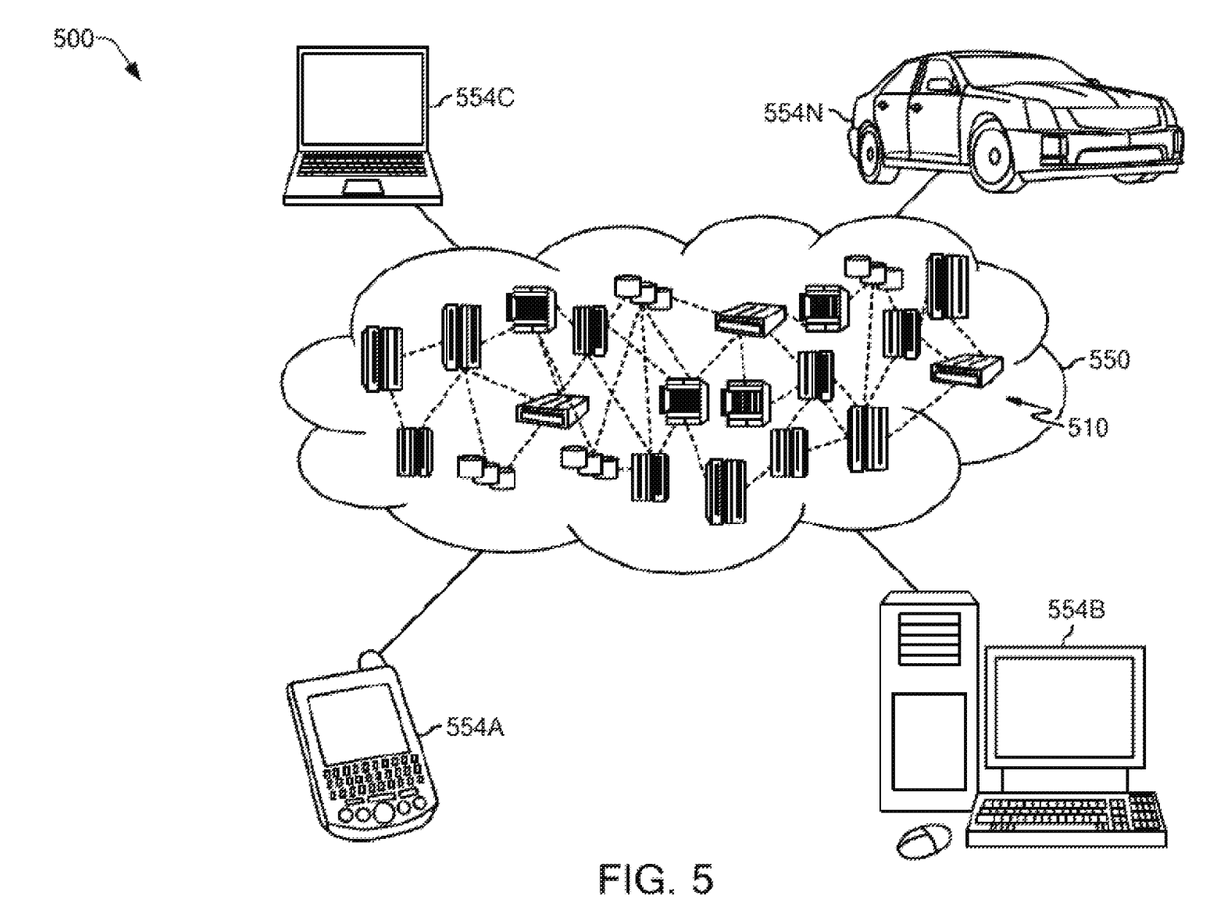
FIG. 5 depicts a cloud computing environment, consistent with an illustrative embodiment.

Referring now to FIG. 5, an illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
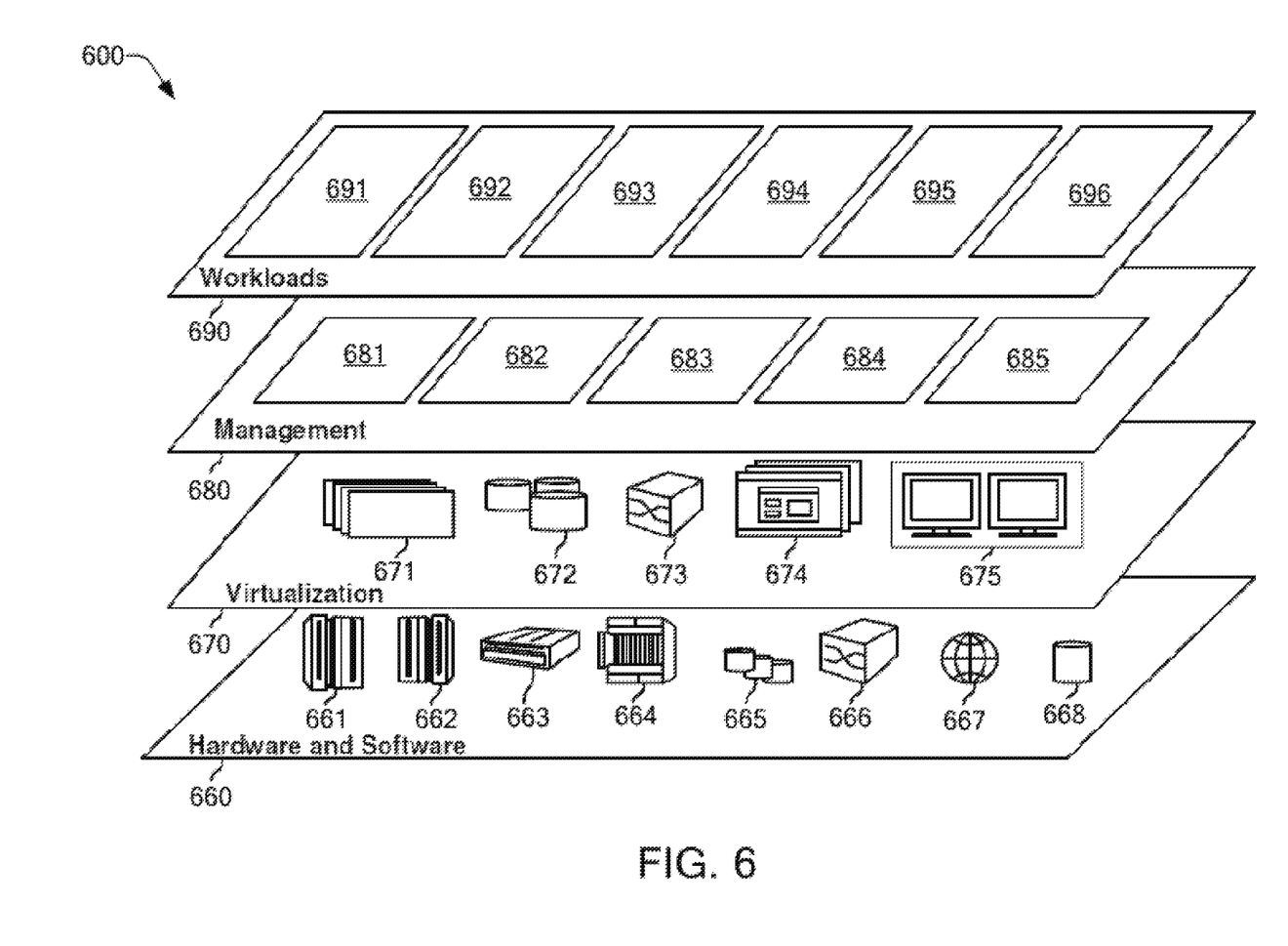
FIG. 6 depicts abstraction model layers, consistent with an illustrative embodiment.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include mapping and navigation 691; software development and lifecycle management 692; virtual classroom education delivery 693; data analytics processing 694; transaction processing 695; and evaluating the user interface design 696 for the computing system for the temporal detection of cycles in pruned transaction graphs, as discussed herein.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a temporal directed cycle detection and pruning engine configured to improving computing efficiency when detecting unauthorized computerized transactions by performing acts comprising:
   identifying irrelevant nodes in a transaction graph based on a plurality of transactions, the transaction graph including nodes indicating transaction origination points and transaction destination points, and edges indicating interactions between the nodes;
   pruning the irrelevant nodes of the transaction graph including nodes involved in an interaction below a first threshold as well as nodes identified as a super node related to an account having a number of incoming or outgoing transactions that is above a second threshold;
   partitioning the pruned transaction graph into sections, where each section includes selected nodes that are linked to other linked nodes therein;
   detecting, by the processor, strong connected components for each of the sections;
   performing, by the processor, parallel detection of a temporal directed cycle in each strongly connected component to reduce the computing time and resources for cycle detection;
   trimming each of the sections having non-cyclic nodes;
   detecting cycles of detected cycle nodes for each of the sections;
   identifying a geo-location of each of the detected cycle nodes;
   pruning selected nodes of the detected cycle nodes upon determining that the selected nodes are associated with a single entity, the selected nodes are separated by a predetermined minimum distance, and the selected nodes are associated with interactions performed within a predetermined maximum time separation; and
   displaying unauthorized transactions on a display, based on the detecting cycles of detected cycle nodes and the pruning.

2. The computing device of claim 1, further comprising applying a time component to each interaction, the time component providing a relative time for each of the interactions between the nodes of the transaction graph.

3. The computing device of claim 2, wherein the edges forming each detected cycle are in temporal sequential order.

4. The computing device of claim 1, further comprising:
   identifying select nodes of the detected cycle nodes associated with known customer attributes; and
   pruning the select nodes of the detected cycle nodes from the detected cycles.

5. The computing device of claim 1, further comprising using machine learning to cause the computing device to identify learned nodes either for pruning from the transaction graph or for flagging as a suspect transaction known to form a transaction cycle.

6. A computer implemented method of improving computing efficiency when detecting unauthorized computerized transactions, comprising:
   identifying irrelevant nodes in a transaction graph, the transaction graph based on a plurality of transactions, the transaction graph including nodes indicating transaction origination points and transaction destination points, and edges indicating interactions between the nodes;
   pruning the irrelevant nodes of the transaction graph including nodes involved in an interaction below a first threshold as well as nodes identified as a super node related to an account having a number of incoming or outgoing transactions that is above a second threshold;
   partitioning the pruned transaction graph into sections, where each section includes selected nodes that are linked to other linked nodes therein;
   detecting strong connected components for each of the sections;
   performing computerized parallel detection of a temporal directed cycle in each strongly connected component to reduce the computing time and resources for cycle detection;
   detecting cycles of detected cycle nodes in the pruned transaction graph;
   identifying a first set of select ones of the detected cycle nodes associated with known customer attributes;
   pruning the first set of select ones of the detected cycle nodes from the detected cycles;
   identifying a geo-location of each of the detected cycle nodes;
   pruning a second set of selected nodes of the detected cycle nodes upon determining that the second set of selected nodes are associated with a single entity, the second set of selected nodes are separated by a predetermined minimum distance, and the second set of selected nodes are associated with interactions performed within a predetermined maximum time separation; and
   displaying unauthorized transactions on a display, based on the detecting cycles of detected cycle nodes and the pruning.

7. The method of claim 6, further comprising applying a time component to each interaction, the time component providing a relative time for each of the interactions between the nodes of the transaction graph.

8. The method of claim 7, wherein the edges forming each detected cycle are in temporal sequential order.

9. The method of claim 6, further comprising:
   partitioning the pruned transaction graph into sections, where each section includes selected nodes that are linked to other linked nodes therein; and
   trimming each of the sections having non-cyclic nodes.

10. The method of claim 6, wherein the processor configures the computing device to perform acts further comprising using machine learning to cause the computing device to identify learned nodes either for pruning from the transaction graph or for flagging as a suspect transaction known to form a transaction cycle.

11. A non-transitory computer readable storage medium tangibly embodying a computer readable program code having computer readable instructions that, when executed, causes a computer device to carry out a method of improving computing efficiency when detecting unauthorized computerized transactions, the method comprising:
identifying irrelevant nodes in a transaction graph, the transaction graph based on a plurality of transactions, the transaction graph including nodes indicating transaction origination points and transaction destination points, and edges indicating interactions between the nodes;
pruning the irrelevant nodes of the transaction graph;
partitioning the pruned transaction graph into sections, where each section includes selected nodes that are linked to other linked nodes therein;
detecting, by the computer device, strong connected components for each of the sections;
performing, by the computing device, parallel detection of a temporal directed cycle in each strongly connected component to reduce the computing time and resources for cycle detection;
trimming each of the sections having non-cyclic nodes;
detecting cycles of detected cycle nodes for each of the sections,
wherein an irrelevant node is a node that is involved in an interaction below a first threshold as well as identified as super node related to an account having a number of incoming or outgoing transactions that is above a second threshold
identifying a first set of select ones of the detected cycle nodes associated with known customer attributes;
pruning the first set of select ones of the detected cycle nodes from the detected cycles;
identifying a geo-location of each of the detected cycle nodes;
pruning a second set of selected nodes of the detected cycle nodes upon determining that the second set of selected nodes are associated with a single entity, the second set of selected nodes are separated by a predetermined minimum distance, and the second set of selected nodes are associated with interactions performed within a predetermined maximum time separation; and
displaying unauthorized transactions on a display, based on the detecting cycles of detected cycle nodes and the pruning.

12. The non-transitory computer readable storage medium of claim 11, wherein the execution of the code by the processor further configures the computing device to perform acts further comprising applying a time component to each interaction, the time component providing a relative time for each of the interactions between the nodes of the transaction graph.

13. The non-transitory computer readable storage medium of claim 11, wherein the execution of the code by the processor further configures the computing device to perform acts further comprising
pruning the first set of select ones of the detected cycle nodes from the detected cycles.

14. The non-transitory computer readable storage medium of claim 11, wherein the execution of the code by the processor further configures the computing device to perform acts further comprising using machine learning to cause the computing device to identify learned nodes either for pruning from the transaction graph or for flagging as a suspect transaction known to form a transaction cycle.

* * * * *